United States Patent [19]

Miller

[11] 4,196,867

[45] Apr. 8, 1980

[54] CRANK SHAFT DEVICE FOR FISHING REEL

[75] Inventor: Vernon R. Miller, Tulsa, Okla.

[73] Assignee: Brunswick Corporation, Skokie, Ill.

[21] Appl. No.: 932,794

[22] Filed: Aug. 11, 1978

[51] Int. Cl.$^2$ ............................................. A01K 89/00
[52] U.S. Cl. .................................. 242/84.1 J; 64/28 R
[58] Field of Search ................ 242/84.21 R, 84.21 A, 242/84.2 G, 84.2 R, 84.1 R; 64/28

[56] References Cited

U.S. PATENT DOCUMENTS

| | | | |
|---|---|---|---|
| 1,776,525 | 9/1930 | Talbot | 64/28 R |
| 2,356,322 | 8/1944 | Johnson | 64/28 R |
| 3,018,979 | 1/1962 | Clickner | 242/84.21 R |
| 3,107,876 | 10/1963 | Oment | 242/84.21 R |
| 3,946,963 | 3/1976 | Oberg | 242/84.21 R |

Primary Examiner—Billy S. Taylor
Attorney, Agent, or Firm—John G. Heimovics

[57] ABSTRACT

This invention comprehends a special shear groove made in a fishing reel handle assembly such that the crank shaft will fracture at the shear groove before it will damage the interior gear mechanism in the housing of the reel. The shaft fracturing at the shear groove prevents the gear train from being damaged.

2 Claims, 5 Drawing Figures

CRANK SHAFT DEVICE FOR FISHING REEL

BACKGROUND OF THE INVENTION

1. Field of the Invention

This invention relates to conventional style and skirted style spinning reels, and more particularly, relates to a shear groove located in the crank shaft of the reel that prevents the gear train and associated mechanism from being damaged.

2. Background of the Prior Art

It is well known in the prior art to make both right hand and left hand winding fishing reels. However, one of the major problems that has been found is that when a large fish is being played, stresses in the crank shaft connecting the handle to the reel's gearing mechanism can take place whereby the gearing of the internal mechanism will be damaged. Thus the handle will break off in the threads inside the fishing reel (cannot be removed by the fisherman) or the gear train will be damaged. This particular kind of problem has plagued fishermen ever since the right hand-left hand winding fishing reels have been available. Unfortunately, the prior art has not yet solved this problem of breaking under torque of the crank handle within the fishing reel mechanism.

SUMMARY OF THE INVENTION

This invention relates to conventional spinning and skirted spinning reels that have a protective device so that when a fishing reel crank handle shaft is screwed into the fishing reel mechanism, the shaft will not break in the threaded portion but break external thereto. This way the problems of the prior art are overcome and the fishing reel mechanism is protected.

It is therefore an object of this invention to provide a means for protecting the gearing mechanism and the screw thread of the crank handle shaft of the fishing reel that is connected to the gearing mechanism from being damaged by overtorquing.

Another object of this invention is to provide a simple means that will protect a fishing reel mechanism from being overtorqued and thus causing internal breakage.

Yet another object of this invention is to provide such a means which constitutes a shear groove in the crank handle.

The above and other and further objects and features will be more readily understood by reference to the following detailed description and the accompanying drawings.

DESCRIPTION OF THE PREFERRED EMBODIMENTS

Figure 1:
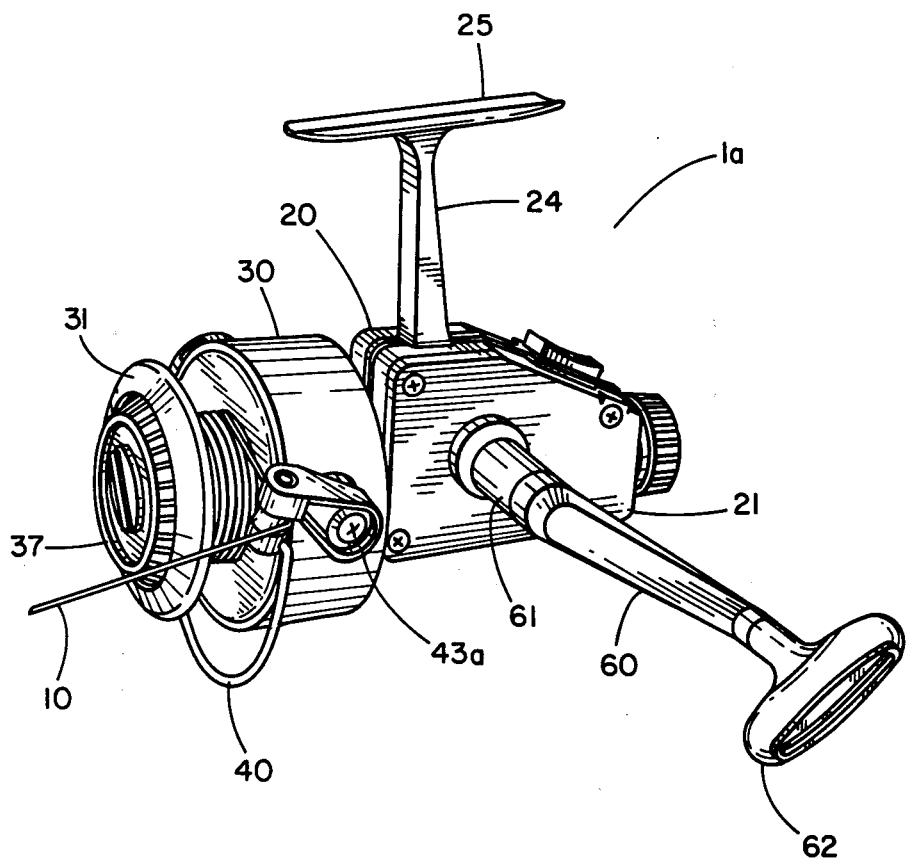
FIG. 1 is a perspective view of the conventional style spinning reel containing the invention described herein.
Figure 2:
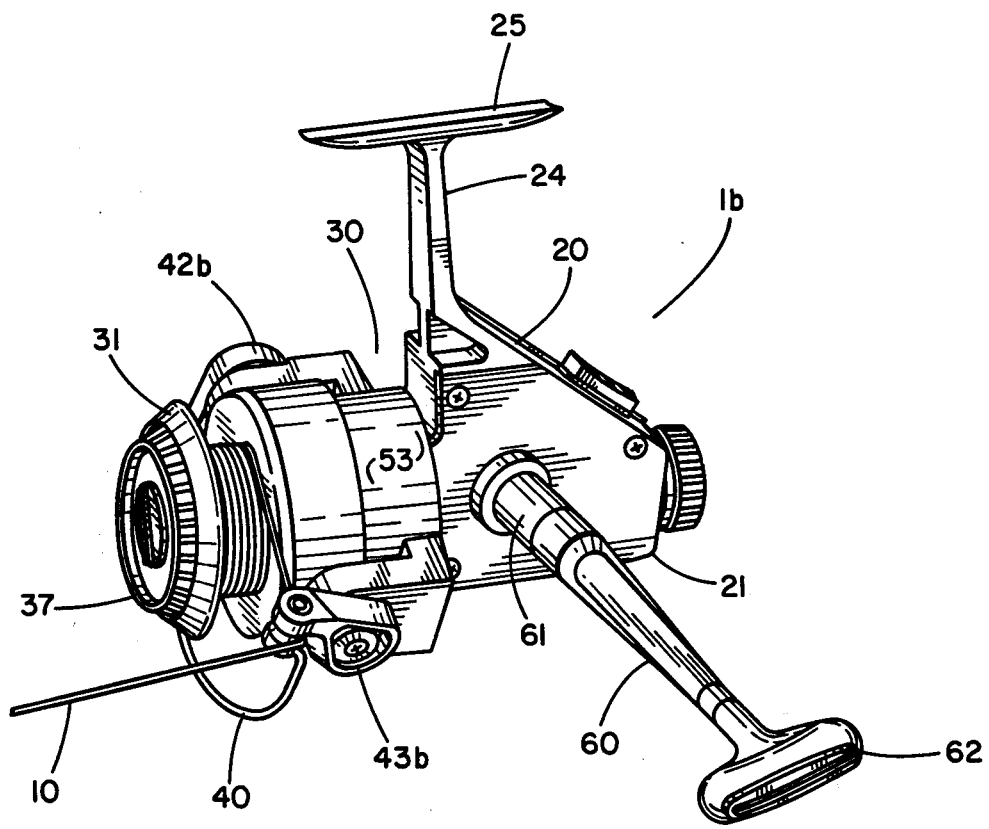
FIG. 2 is a perspective view of the skirted style spinning reel containing the invention described herein.
Figure 3:
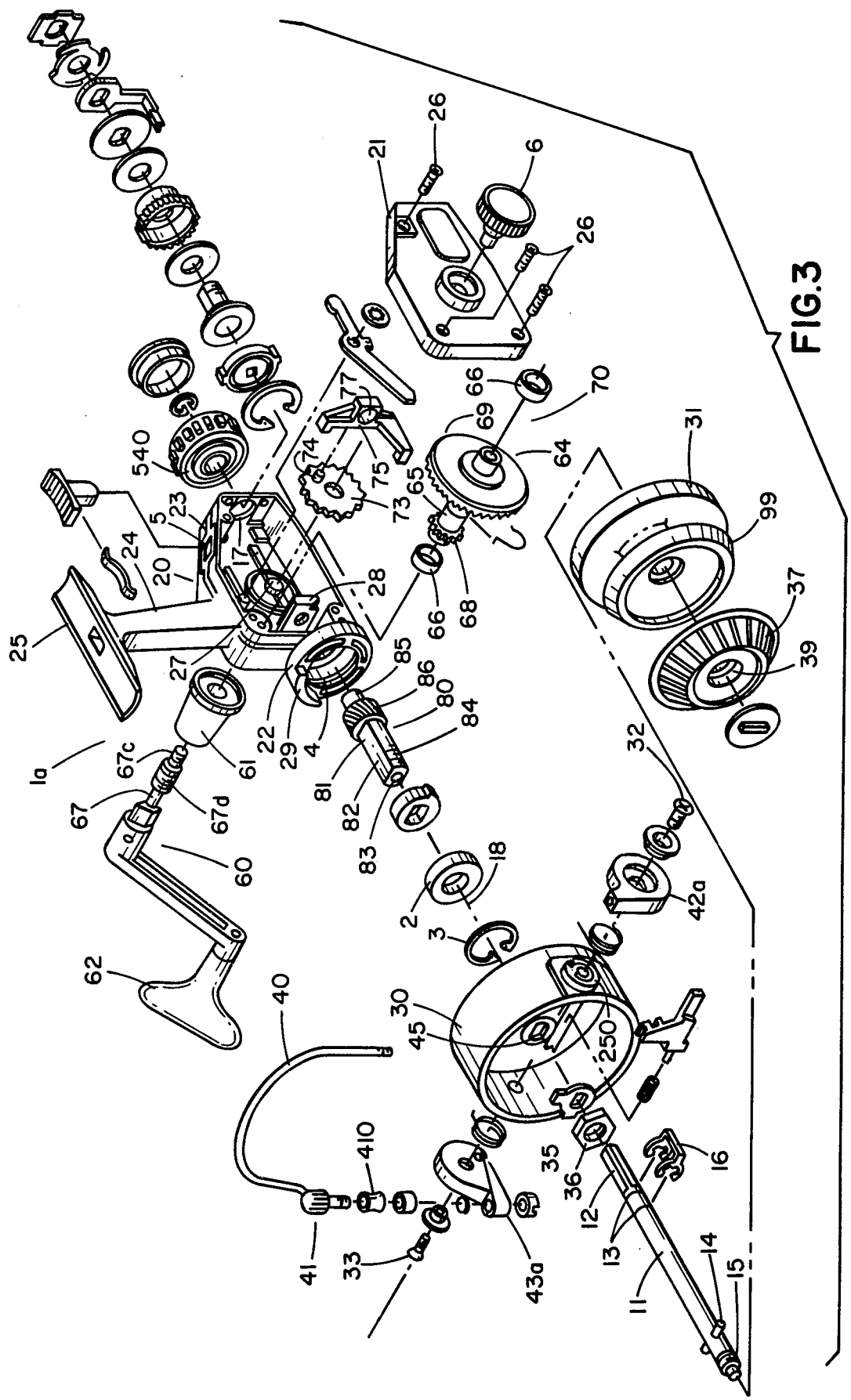
FIG. 3 is an exploded perspective view of the conventional style spinning reel containing the invention described herein.

In FIG. 1, a conventional style open-face fishing reel 1a is shown and in FIG. 2 a skirted style open-face fishing reel 1b is shown. Both styles of reels function similarly, the only exception being the arrangement of the spool. As used hereinafter, the same numerals will designate the common parts for both reels; for special parts on the reels different numerical designations will be used. The reel 1a or 1b having a housing 20 which includes an integral gear case 23 and a stem 24 which connects the housing to a shoe 25. The shoe 25 is used to attach the reel to spinning style fishing rods. The reel inclues a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 62 may be disposed on the other side of the gear case 23 for accommodating the personal desires of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechanism 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1 and 2, the bail 40 is shown in the "closed", "retrieve", or "rewind" position. The line guide roller 410 is preferably rotatable, that is, it is preferably a miniature pulley to reduce the sliding friction which might otherwise cause line wear.

In paying out the line 10 over the lip 99 of the forward flange of the spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 of oscillator slider 75. Rotation of the gear 73 causes the slider 75 to slide forward and backward. Crank shaft gear assembly 64 has a tubular center drive shaft 65 that is journal mounted in bearings 66 in gear case 23 (partly shown) and in cover plate 21. The center drive shaft 65 has an internal right hand thread that mates with the right hand thread 67c of handle crank shaft 67 on one side and a left hand thread that mates with left hand thread 67d when the shaft is placed on the other side of the reel.

This dual threaded system enables the reel to be cranked both from the right hand and the left hand. The open end of the drive shaft 65 (the end which the shaft 67 is not inserted) is closed off by inserting screw cap 6 exterior of the gear case 23.

Figure 4:
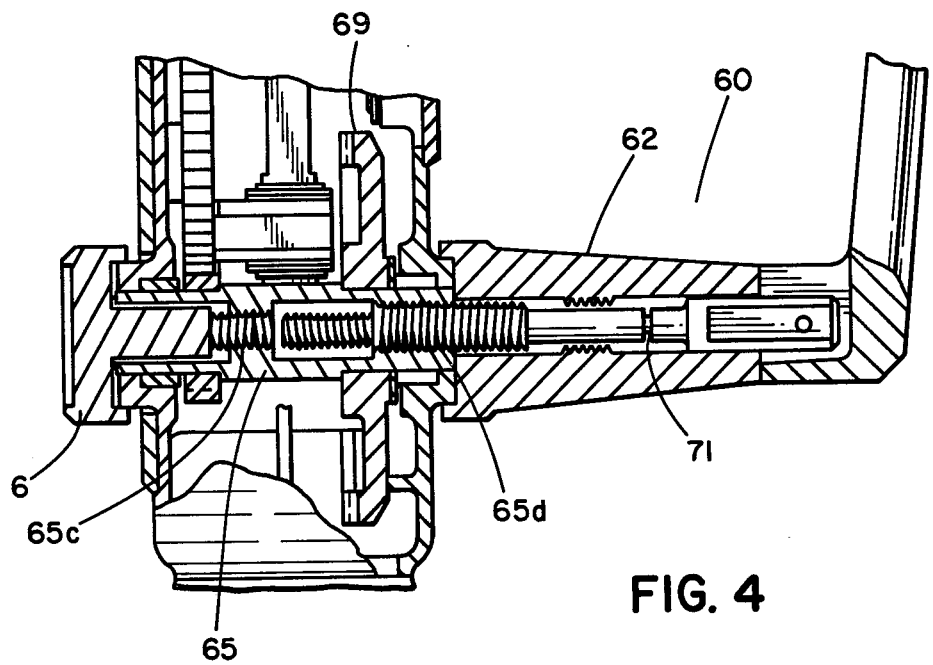
FIG. 4 is a partial cross sectional view of a side portion of the fishing reel gear shaft and crank shaft.
Figure 5:
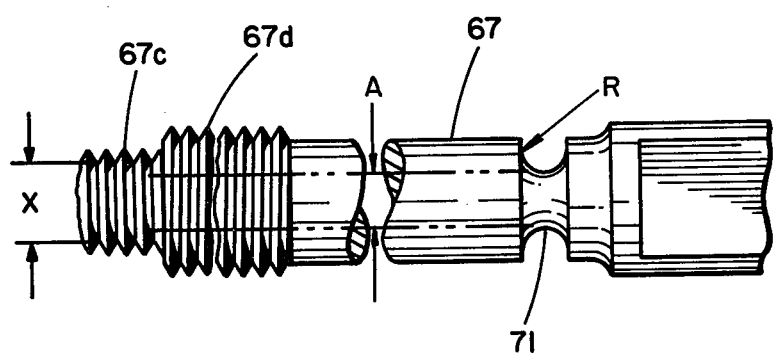
FIG. 5 is a partial side view of the crank shaft handle depicting the embodiment of this invention.

In a preferred embodiment of the invention, as shown in FIGS. 4 and 5, the center shaft drive 65 has a right hand internal thread 65c located towards the center and a left hand internal thread 65d located near the end of the shaft. These threads mate with thread 67c and thread 67d for either right hand or left hand mounting of the handle 60. The right hand threads 65c and 67c have a minor diameter of "X". If there was any undue torque on the handle, it would be expected that the crank shaft 67 would break in one of the threaded portions. In the event of a break, it would be very difficult for a fisherman to remove the borken end of the shaft. This invention comprehends that an undercut shear groove 71 be cut in the metal shaft external to the reel body, as shown in FIG. 8, with the undercut groove 71 having a diameter a substantially less than that of "X". The groove 71 can have a radius "R" at its root, as shown in FIG. 9. Therefore, if the crank handle mechanism is subjected to a high torque force, the handle crank shaft 67 will break at groove 71 rather than in the threads. Thus, it will be possible to use a simple pliers (or other such common tool) to remove the broken shaft and replace it. The shear groove 71 will also aid in protecting the gear train assembly connected to the crank shaft 67 and mounted on the center drive shaft 65.

Small gear 68 meshes with gear 73 as the handle 62 rotates the crank shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center spool shaft 11 has back square portion 12, undercut grooves 13, front pin 14 which press fit into the spool shaft 11 and a front threaded portion 15. The shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider 75 oscillates back and forth the spool shaft 11 also moves back and forth with respect to the forward section 22 of the housing 20.

The rotor 30 is mounted on the forward portion 81 of assembly 80. The hole 34 with flats 34c is sufficiently large to pass over the pin 14 and then tighten on the forward threaded portion 84 by the use of tang 35 and nut 36; the respective flats 82 and 34c operable with each other. The spool 31 fits over the spool shaft 11 with the spool retainer knob 37 that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the drive shaft 11 to move back and forth, so that line 10 can be wound during the retrieve mode in an orderly and uniform fashion on spool 31.

The drag mechanism 50 attaches to the square portion of the spool shaft 11 and permits limited rotation of the spool 31. For example, when an individual is trying to land a large fish and the drag mechanism 50 is set too tightly, it is quite possible to overstress a standard crank shaft or gear train breaking either or both. The shear groove 71 comprehended by this invention eliminates this potential problem of a broken shaft or damaged gears.

Although specific embodiments of the invention have been described, many modifications and changes may be made in the fishing reel without departing from the spirit and scope of the invention as defined in the appended claims.

What is claimed is:

1. In an open face fishing reel having a housing, a center drive shaft mounted in the housing, a gear mounted on the center drive shaft inside the housing, means supporting the opposite ends of the drive shaft in the housing, a pinion gear located in the housing in contact with the gear thereby comprising a gear system, the improvement comprising a handle crank shaft having a threaded portion at one end of the shaft, the threaded portion having a minor thread diameter of "X"; cooperating threaded means at one end of the drive shaft for mounting the crank shaft; a pivotal attachment means at the other end of the crank shaft for securing a crank handle thereto defining a handle end; the handle end of the crank shaft being external of the means supporting the drive shaft and the threaded portion, and having a shear groove that has a diameter "A" substantially less than the minor diameter "X" of the thread so that in the event the crank handle is torqued too greatly, the crank shaft will shear at the shear groove rather than damaging the threads, center shaft supporting means or the gearing system within the housing.

2. The reel of claim 1 wherein there is a radius where the diameter of the groove blends with the crank shaft.

* * * * *